(12) United States Patent
Jagadish et al.

(10) Patent No.: US 6,173,046 B1
(45) Date of Patent: *Jan. 9, 2001

(54) CUSTOMER GROUP BILLING

(75) Inventors: Hosagrahar V. Jagadish; Inderpal S. Mumick, both of Berkeley Heights, NJ (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/807,355

(22) Filed: Feb. 27, 1997

(51) Int. Cl.[7] .................................................. H04M 15/00

(52) U.S. Cl. ........................... 379/111; 379/127; 379/112; 379/113; 379/115; 379/119

(58) Field of Search ................... 379/111–115, 118–119, 379/120, 121, 144–145, 116, 126, 135, 127, 133–134

(56) References Cited

U.S. PATENT DOCUMENTS

| | | |
|---|---|---|
| 4,979,207 | 12/1990 | Baum et al. . |
| 5,146,491 | 9/1992 | Silver et al. . |
| 5,222,125 | 6/1993 | Creswell et al. . |
| 5,291,543 | 3/1994 | Freese et al. . |
| 5,333,184 * | 7/1994 | Doherty et al. ...................... 379/115 |
| 5,359,642 | 10/1994 | Castro . |
| 5,381,467 | 1/1995 | Rosinski et al. . |
| 5,384,831 | 1/1995 | Creswell et al. . |
| 5,450,477 | 9/1995 | Amarant et al. . |
| 5,506,893 | 4/1996 | Buscher et al. . |
| 5,517,555 * | 5/1996 | Amadon et al. ..................... 379/112 |

(List continued on next page.)

FOREIGN PATENT DOCUMENTS

| | | |
|---|---|---|
| 2313744A | 12/1997 | (GB) . |
| WO 93/03571 | 2/1993 | (WO) . |
| WO 94/28683 | 12/1994 | (WO) . |

OTHER PUBLICATIONS

Bob Wallace, AT&T announces calling plan . . . its alternative to MCI's Preferred. Network World, Apr. 1, 1991.*

* cited by examiner

*Primary Examiner*—Duc Nguyen

(57) ABSTRACT

A method and system in which calls made by customers who are members of a group of customers having a group calling plan, but who have separate billing accounts, are priced based on the group calling plan and on the usage by other members of the group. Typical groups may include customers in specific geographic locations, such as residents in an apartment building or in a residential neighborhood, and offices and stores in a commercial building. Other groups may include customers in widely separated geographic locations, such as members of a nation-wide club or organization, alumni association members, etc. In order to price a call made over a network by a customer of the network, the customer being a member of a billing group, information specifying a group billing plan of the billing group is stored. A call made by a member of the billing group is priced based on the group billing plan. Information specifying a plurality of members of a billing group, the members selected from among the customers of the network, is also stored. The call is then priced by generating a record that describes the call, receiving the record at a billing analysis system; and determining a priced call value for the call based on the record, the information specifying members of the billing group, and the information specifying the group billing plan based on the group billing plan.

9 Claims, 4 Drawing Sheets

U.S. PATENT DOCUMENTS

| | | |
|---|---|---|
| 5,544,229 | 8/1996 | Creswell et al. . |
| 5,553,131 | 9/1996 | Minervino, Jr. et al. . |
| 5,557,664 | 9/1996 | Burns et al. . |
| 5,568,541 | 10/1996 | Greene . |
| 5,570,417 | 10/1996 | Byers . |
| 5,577,101 | 11/1996 | Böhm . |
| 5,579,379 | 11/1996 | D'Amico et al. . |
| 5,581,607 | 12/1996 | Richardson, Jr. et al. . |
| 5,592,537 | 1/1997 | Moen . |
| 5,915,006 * | 6/1999 | Jagadish et al. ............ 379/127 | ed on the group billing plan.

CUSTOMER GROUP BILLING

FIELD OF THE INVENTION

The present invention relates to a system and method for group billing of telephone service customers having separate billing accounts.

BACKGROUND OF THE INVENTION

Discount telephone billing plans have become commonplace. In a typical plan, a customer receives a discount on all calls made if total usage exceeds a predefined time or monetary limit. Such discount billing plans have been extended to organizational customers, such as companies and universities, which have multiple individuals placing calls, but which have only one billing account. Groups of customers who have separate billing accounts have been unable to participate in discount billing plans as a group because there is no way that calls made by such customers can be priced based on the group calling plan and on the usage by other members of the group.

SUMMARY OF THE INVENTION

The present invention is a method and system in which calls made by customers who are members of a group of customers having a group calling plan, but who have separate billing accounts, are priced based on the group calling plan and on the usage by other members of the group. Typical groups may include customers in specific geographic locations, such as residents in an apartment building or in a residential neighborhood, and offices and stores in a commercial building. Other groups may include customers in widely separated geographic locations, such as members of a nation-wide club or organization, alumni association members, etc.

According to the present invention, in order to price a call made over a network by a customer of the network, the customer being a member of a billing group, information specifying a group billing plan of the billing group is stored. A call made by a member of the billing group is priced based on the group billing plan. Information specifying a plurality of members of a billing group, the members selected from among the customers of the network, is also stored. The call is then priced by generating a record that describes the call, receiving the record at a billing analysis system; and determining a priced call value for the call based on the record, the information specifying members of the billing group, and the information specifying the group billing plan based on the group billing plan.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1A:
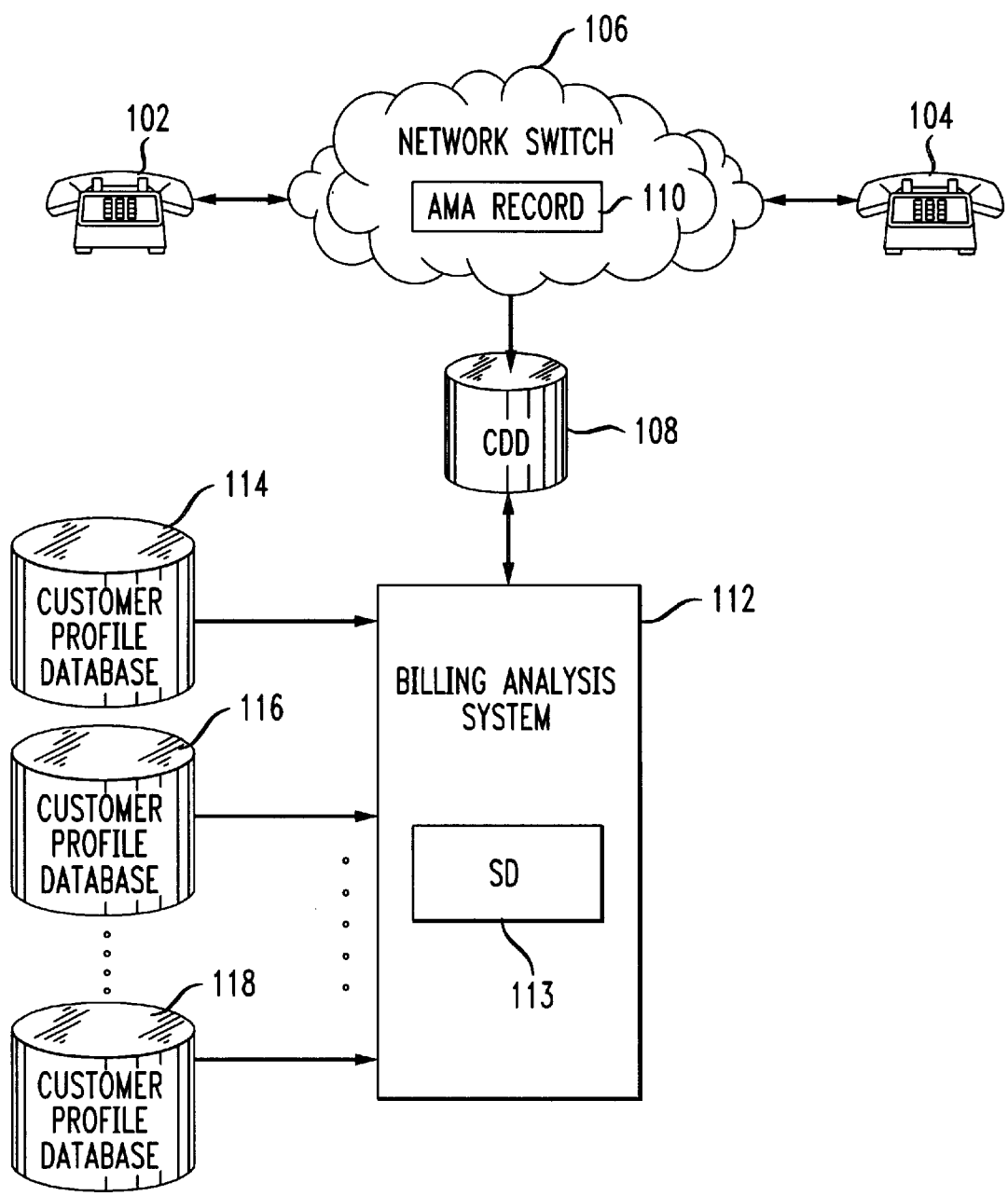
FIG. 1a is a block diagram of one embodiment a telephone call billing system, in which the present invention may be implemented.

Referring to FIG. 1a, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS® switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage. A method for passing the data back to the CDD is disclosed in co-pending, commonly assigned, U.S. patent application Ser. No.: 08/607,983—entitled "Compression and Buffering of a Stream with Data Extraction Requirements"—which application is incorporated herein by reference.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1a, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer. For example, a customer may subscribe to a plan in which calls made during the hours between 5:00 pm and 9:00 am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

Figure 1B:
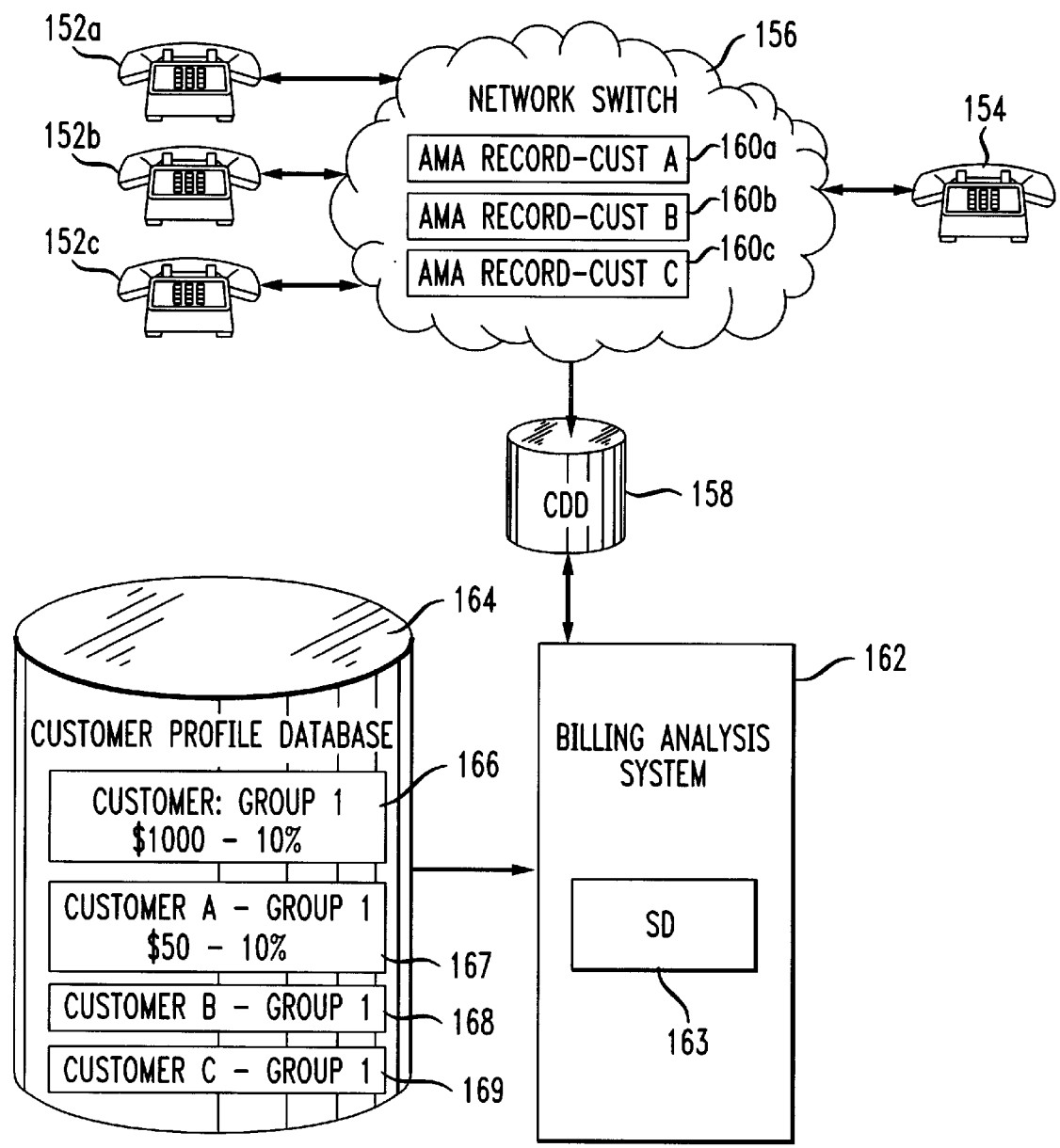
FIG. 1b is a block diagram of the telephone call billing system of FIG. 1a, showing a customer profile database according to the present invention.

The processing involved in customer group billing is shown in FIG. 1b, which, as an example, shows the present invention implemented in the telephone billing system of FIG. 1a. The present invention may be similarly implemented in the telephone billing systems shown in FIGS. 3 and 4.

Customers belonging to a particular customer group place calls from calling stations 152a–c, which have been registered in the group. Each call is routed through a network switch 156, which generates a corresponding AMA record 160a–c. Each AMA record includes an indication of the customer that placed the call. Typically the Automatic Number Identification (ANI) is used for this purpose. In an ANI system, the number of the telephone station from which a call is initiated is determined and used to identify the party who initiated the call. Each AMA record is passed to CDD 158, making the record available for call pricing. Each AMA record is passed from CDD 158 to billing analysis system 162, which applies the customer specific billing parameters contained in the attached customer profile database, such as database 164.

In the present invention, each customer group is treated as a customer separate from the members of the group. Thus, customer profile database 164 includes a customer profile, such as profile 166, for each group. Customer profile database 164 also includes a customer profile for each individual customer, such as entries 167–9. Each customer profile includes parameters that indicate billing actions to be taken for that customer. For example, customer profile 167, which corresponds to customer A, includes a discount parameter indicating that customer A is to receive a discount of 10% once customer A's total usage reaches $50.00. Likewise, customer profile 166, which corresponds to group 1, includes a discount parameter indicating that each member of group 1 is to receive a 10% discount once total group usage reaches $1000.00. Each customer profile corresponding to a customer who is part of a billing group includes a parameter indicating the billing group. For example, customer profile 167 includes a parameter indicating that customer A is a member of group 1.

For each AMA record received, billing analysis system 162 accesses the customer profile for the customer indicated in the AMA record and obtains the group indicator. The customer profile for the indicated group is accessed and the AMA record is processed accordingly. In addition, summary data 163 is generated not only for the individual customer, but for the group as well. Thus, each AMA record is rated based not only on the individual customer profile, but based on the group profile as well. This allows billing plan processing to be applied to all calls made by all members of a billing group. All well-known billing plans, such as usage-based discounts, etc., may be applied to the billing group members.

Figure 2:
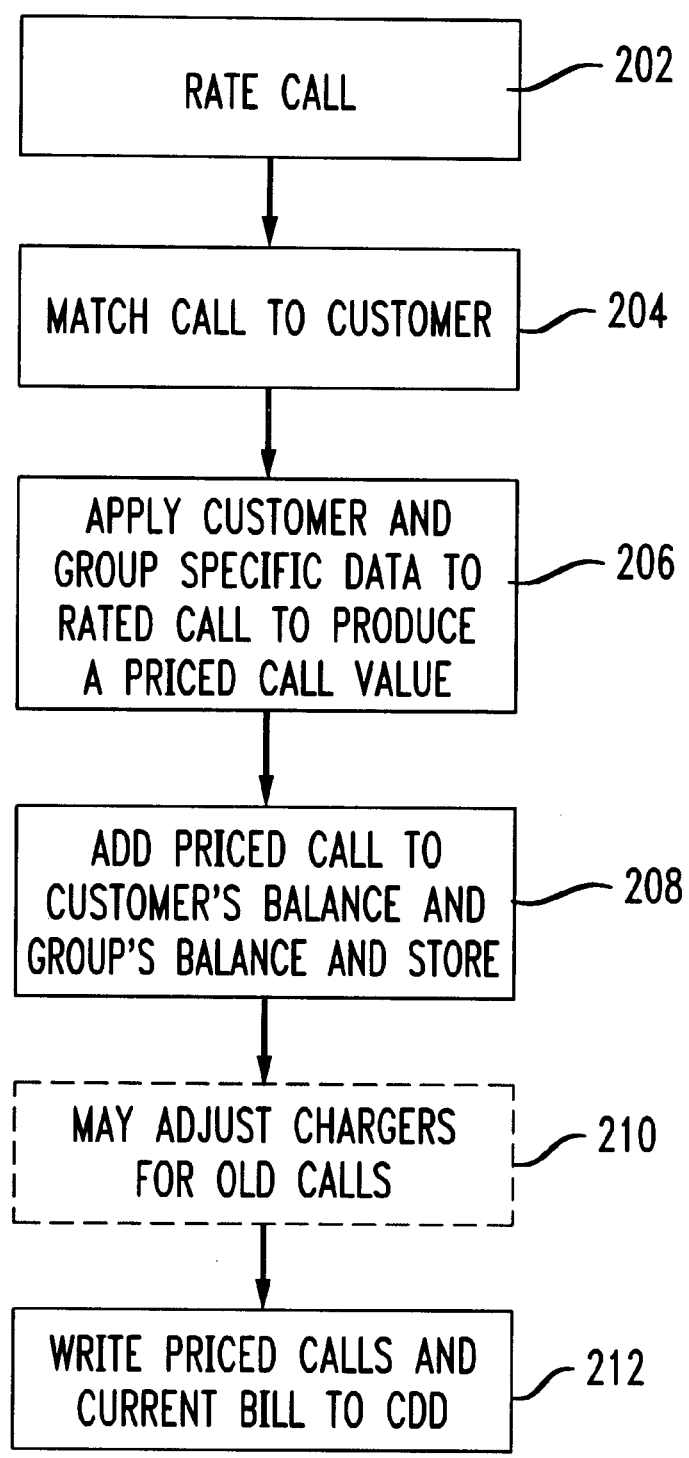
FIG. 2 is a flowchart depicting the steps involved in a procedure that a billing analysis system may use to perform customer group billing processing for each call, according to the present invention.

FIG. 2 shows, in flowchart form, a procedure that a billing analysis system may use to perform customer group billing processing for each call. In the following description of the flowchart references will be made to the embodiment shown in FIG. 1b.

Upon receiving an AMA record, such as 160a from CDD 158, the first step billing analysis system 162 takes is to rate the call (step 202). It must then match the rated call to the customer (step 204) so that customer specific parameters can be applied to the call. Several well known techniques can be used to match the rated call to the customer. One such technique uses Automatic Number Identification (ANI). In an ANI system, the number of the telephone station from which a call is initiated is determined and used to identify the party who initiated the call. Accordingly, in the FIG. 1b embodiment, the number of a telephone, such as 152a may be determined and passed to the billing analysis system along with the AMA record. The billing analysis system may then cross-reference the number to the customer profile containing the customer specific data to be used for the current call. For example, AMA record 160a, which relates to customer A, is cross-referenced to customer profile 167, which also relates to customer A. Customer profile 167 indicates that customer A is a member of group 1, so customer profile 166, which relates to group 1, is also cross-referenced. Once the appropriate profiles have been determined, the billing analysis system applies the customer and group specific data contained in the profiles to the rated call to produce a priced call value (step 206). The priced call value may be added to the customer's previous balance to create a new balance, or "current bill" (step 208). The priced call value may also be added to the group's previous balance to create a new balance for the group. Finally, the priced call value (processed AMA record) for the customer is stored in the CDD, and the current bill (summary information) for both the customer and the group is stored in the SD (step 212). The group is treated as a separate customer from any members of the group and the group's AMA record set is the union of AMA records for all customers in the group. As described in relation to FIG. 1a, an alternative scheme is to store both the priced call value and current bill—collectively termed "the priced call data"—in the SD; in which case, step 212 would involve storing the priced call value and the current bill in the SD.

As an optional step in the procedure of FIG. 2, the billing analysis system may adjust charges for old calls to reflect certain types of billing plans (step 210). For example, a customer may subscribe to a plan in which the customer receives a conditional 10% discount on all calls, the condition being that the customer exceed $50.00 in total charges for a given billing period. In such a scenario, calls will initially be billed at the full rate, until such time that the customer reaches $50.00 in total charges. Thus, if the customer does reach $50.00 before the end of the billing period, not only will successive calls need to be discounted by 10%, but all previous calls will need to be discounted by 10%. This requires that prices generated for the previous calls be retroactively adjusted.

In step 210, the billing analysis system may adjust charges for old calls for the customer based on the total group charges for a given billing period. This is possible because the group balance is available to the billing analysis system. The billing analysis system may also adjust charges for all members of the group based on the total group charges for a given billing period. The group is treated as a separate customer and the group's AMA record set, which is the union of the AMA records of all customers in the group, may be adjusted as for any other customer. For example, all members of a group may received a 10% discount once total group usage reaches $1000.00. All successive calls made by group members will receive a 10% discount and prices generated for previous calls made by group members will be retroactively adjusted.

Figure 3:
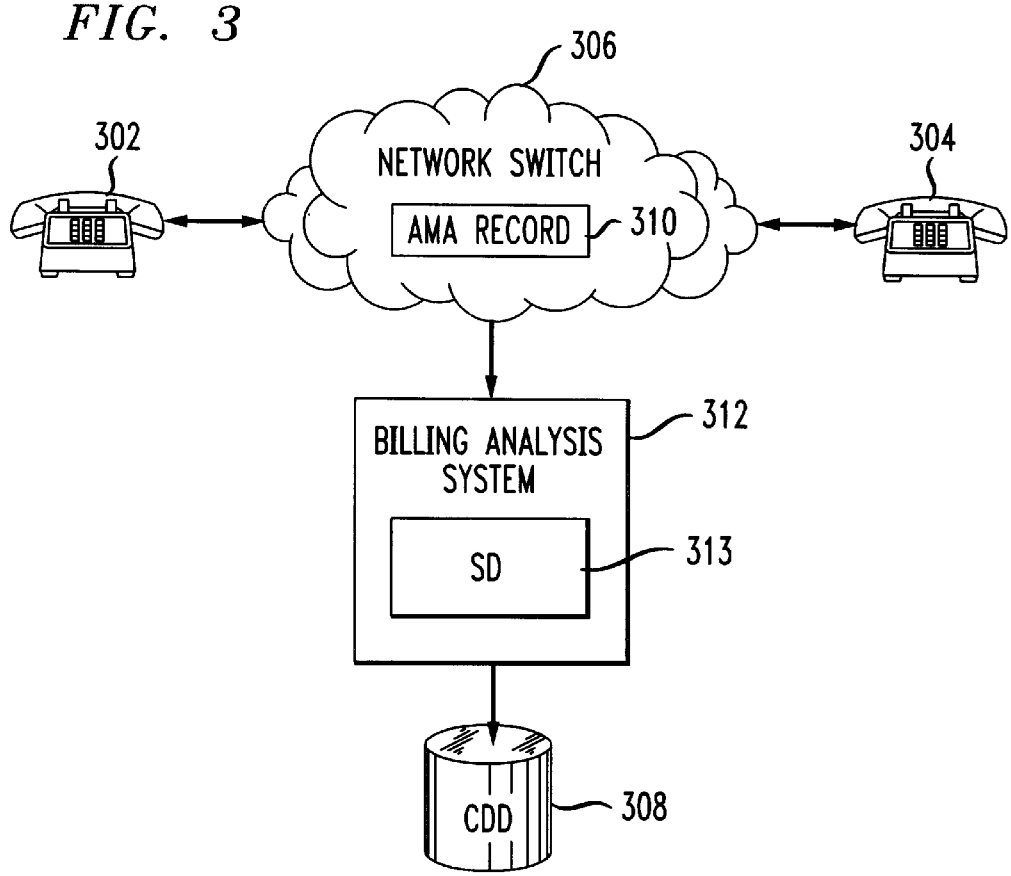
FIG. 3 is a block diagram of another embodiment a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific parameters to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
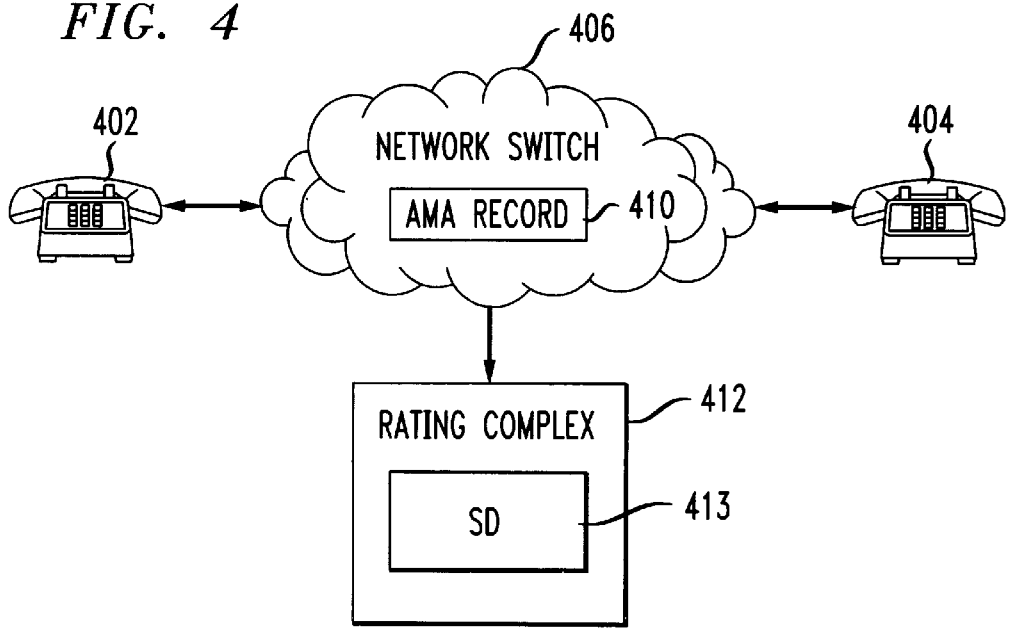
FIG. 4 is a block diagram of another embodiment a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of pricing a call made over a network comprising the steps of:

storing information specifying a plurality of members of a billing group, the members selected from among customers of the network, at least some of the members of the billing group being different customers of the network having separate billing accounts and receiving separate bills;

storing information specifying a group billing plan of the billing group;

generating a record that describes the call, the call placed by a member of the billing group;

receiving the record at a billing analysis system;

determining a priced call value for the call based on the record, the information specifying members of the billing group, and the information specifying the group billing plan, wherein the priced call value incorporates one or more discounts to which the group is entitled; and updating the current bill of the billing group member that placed the call by adding the priced call value to the balance of the billing group member that placed the call.

2. The method of claim 1, further comprising the step of:

storing information relating to total usage by the billing group.

3. The method of claim 2, wherein the pricing step includes pricing the call based on the total usage by the billing group.

4. A system for pricing a call made over a network comprising:

a database including information specifying a plurality of members of a billing group, the members selected from among customers of the network, at least some of the members of the billing group being different customers of the network having separate billing accounts and receiving separate bills, and information specifying a group billing plan of the billing group;

a network switch generating a record that describes the call, the call placed by a member of the billing group;

a billing analysis system determining a priced call value for the call based on the record, the information specifying members of the billing group, and the information specifying the group billing plan, wherein the priced call value incorporates one or more discounts to which the group is entitled, and updating the current bill of the billing group member that placed the call by adding the priced call value to the balance of the billing group member that placed the call.

5. The system of claim 4, wherein the database further includes information relating to total usage by the billing group.

6. The system of claim 5, wherein the billing analysis system further determines the priced call value based on the total usage by the billing group.

7. A system for pricing a call made over a network comprising:

means for storing information specifying a plurality of members of a billing group, the members selected from among customers of the network, at least some of the members of the billing group being different customers of the network having separate billing accounts and receiving separate bills;

means for storing information specifying a group billing plan of the billing group;

means for generating a record that describes the call, the call placed by a member of the billing group;

means for determining a priced call value for the call based on the information specifying members of the billing group, and the information specifying the group billing plan, wherein the priced call value incorporates one or more discounts to which the customer is entitled; and means for updating the current bill of the billing group member that placed the call by adding the priced call value to the balance of the billing group member that placed the call.

8. The system of claim 7, wherein the database further includes means for storing information relating to total usage by the billing group.

9. The system of claim 8, wherein means for determining a priced call value further determines the priced call value based on the total usage by the billing group.

* * * * *